United States Patent [19]
Allen et al.

[11] Patent Number: 6,099,613
[45] Date of Patent: Aug. 8, 2000

[54] METHOD AND APPARATUS FOR COMPOSTING ORGANIC MATERIAL

[75] Inventors: Jan W. Allen, Shoreline, Wash.; Hans C. Jumelet, Wageningen, Netherlands

[73] Assignee: Cedar Grove Composting, Inc., Seattle, Wash.

[21] Appl. No.: 09/264,603

[22] Filed: Mar. 8, 1999

Related U.S. Application Data

[62] Division of application No. 08/692,423, Aug. 5, 1996, abandoned.

[51] Int. Cl.$^7$ .............................. C05F 11/08; C12M 1/00; C12M 1/02
[52] U.S. Cl. ......................... 71/9; 435/290.1; 435/290.2; 435/290.4
[58] Field of Search ................... 71/8, 9, 11; 435/290.1, 435/290.2, 290.4

[56] References Cited

U.S. PATENT DOCUMENTS

| | | | |
|---|---|---|---|
| 4,211,545 | 7/1980 | Graefe | 71/9 |
| 4,288,241 | 9/1981 | Shelef | 71/9 |
| 4,483,704 | 11/1984 | Easter, II | 71/9 |
| 4,521,517 | 6/1985 | Gauthier | 435/313 |
| 5,129,935 | 7/1992 | Cerroni | 71/9 |
| 5,459,071 | 10/1995 | Finn | 435/290.2 |
| 5,538,860 | 7/1996 | Castelli | 435/41 |
| 5,755,852 | 5/1998 | Northrop | 71/9 |
| 5,830,358 | 11/1998 | White | 71/9 |

OTHER PUBLICATIONS

Goldstein, Nora, "In–Vessel Systems for On–Site Management," *BioCycle*, pp. 74–79, Feb., 1996.

Gies, Glenda, "Modular Management of Residential Organics," *BioCycle*, pp. 80, 82, Feb. 1996.

"NaturTech: Composting . . . Like you've Never Imagined It," promotional materials produced by NaturTech Composting Systems, Inc., Saint Cloud, Minnesota undated materials which applicant became aware of on or about Apr., 1996.

"Containerized Compost System," promotional materials produced by Green Mountain Technologies, Inc., Seattle, Washington and Whitingham, Vermont, undated materials which applicant became aware of on or about Mar., 1996.

de Jong, H.B.A., W.F. Koopmans, A. van der Knijff and H.J. Jumelet, "Conversion Techniques for VGF Biowaste," prepared by Haskoning Royal Dutch Consulting Engineers and Architects, Nijmegen, The Netherlands, and managed and coordinated by Netherlands Agency for Energy and Environment (NOVEM), Utrecht, The Netherlands. Report completed in Feb., 1993 and translated in Jan., 1994.

Allen, Jan memorandum entitled, "GVRD Composting Planning Work," Nov. 19, 1993.

Croteau, Gerry, Jan Allen and Steve Banchero, "Overcoming the Challenges of Expanding Operations," *BioCycle*Mar., 1996.

*Primary Examiner*—Wayne Langel
*Attorney, Agent, or Firm*—Seed Intellectual Property Law Group PLLC

[57] ABSTRACT

A composting method and apparatus is shown and described. A volume of organic material to be composted is stacked on a surface to form a pile. A plurality of pipes are provided below the surface on which the pile is formed, each of the pipes having a plurality of holes that are aligned with corresponding holes in the surface. The pipes are connected to a manifold which in turn is coupled to a fan assembly, the fan assembly selectively creating positive and negative air flow through the pile. Air and moisture drawn from the pile flows through a conduit to a biofilter, cool air and fluid being added to the conduit upstream of the biofilter. The conduit passes through a greenhouse, such that heat radiated from the conduit is collected and used by the greenhouse. Moisture collected from the system may be treated and reused, for example, to irrigate the piles.

18 Claims, 8 Drawing Sheets

METHOD AND APPARATUS FOR COMPOSTING ORGANIC MATERIAL

This application is a divisional of U.S. patent application Ser. No. 08/692,423, filed Aug. 5, 1996, abandoned.

TECHNICAL FIELD

This invention relates to a method and apparatus for composting organic material.

BACKGROUND OF THE INVENTION

An increasing demand for the ability to recycle wastes, as well as environmental concerns, have led to the growth and expansion of the composting industry.

Currently available composting systems use turned windrows, in-vessel systems, or large static piles. However, these systems have several disadvantages. For example, although a turned windrow process creates stable compost relatively quickly, it requires large amounts of space within which to work, and problems are typically encountered with odor migration. Although the use of large static piles maximizes the use of space and minimizes the release of odors, the decomposition process typically takes 12–24 months. In-vessel systems offer performance improvements, but at substantially higher costs. Some systems use aerated static piles, although these currently available systems also have shortcomings.

Accordingly, there is a need in the art for an improved composting system, and in particular, a composting system that operates more efficiently than currently available systems, while reducing odors and costs. The present invention fulfills these needs, and provides further related advantages.

SUMMARY OF THE INVENTION

Briefly, the present invention provides an improved method and apparatus for composting organic material using positive and negative airflow through the organic material. Any organic material may be composted in accordance with the present invention, including, but not limited to, wood waste, yard waste and food waste. In a preferred embodiment of the present invention, a volume of organic material is loosely stacked on a surface to form a porous pile. A plurality of pipes are provided below the surface on which the pile is formed, each of the pipes having a plurality of holes that are aligned with corresponding holes in the surface. The pipes are connected to a manifold which in turn is coupled to a fan assembly, the fan assembly selectively creating a positive or negative air flow through the pipes and through the pile. By providing the pipes below the surface, a more uniform and reliable air distribution is achieved because the pipes remain in a selected position and are undamaged by the stacking and removing of piles on the surface. In contrast, currently available systems provide pipes above ground that are displaced during the stacking of material and that are crushed by heavy machinery driving over the surface during the removal of material, requiring the pipes to be replaced between batches.

The fan assembly is provided with a fan and a system of conduits and valves that are selectively opened and closed to selectively push or pull a volume of air through the pile. In a preferred embodiment, a negative air flow is used for a selected period of time, for example, three weeks, to draw air, moisture and odors down through the pile. When bad odors are substantially eliminated from the material due to humification, a positive air flow through the conduit and pipes is used to fluff or increase porosity of the pile, thereby facilitating the decomposition process. Once the pile is removed from the surface, positive air flow may also be used to blow out debris from the openings in the surface.

In a preferred embodiment, air and water collected in the manifold from the pipes are mixed with cool air and water vapor to saturate the air in the conduit, to dissolve waste such as ammonia, and to reduce the temperature, prior to passing the air and water in the conduit through a biofilter. Prior to flowing through the biofilter, the conduit passes through a greenhouse which captures and uses heat radiated from the conduit. In a preferred embodiment, a sensor assembly is coupled to the conduit upstream of the biofilter, to monitor selected parameters such as temperature and moisture content. The rate of addition of water vapor and air to the system may therefore be adjusted as needed to maintain temperature, moisture saturation and oxygen and ammonia contents at desired levels. In this manner, proper conditions are created to cultivate a desired bacterial community that mineralizes odorous compounds. Once discharged from the conduit, the water may be collected and reused, for example, to irrigate the piles.

In a preferred embodiment, a plurality of piles are created, each pile being processed as described above. After a selected period of time, each pile is moved to a new location, for example, via a conveyor, which movement agitates and breaks up the pile. The pile is then treated again in accordance with the process outlined above. By processing organic material in accordance with a preferred embodiment of the present invention, piles of up to 10,000 cubic yards of material may be transformed into stable compost within 10 weeks, with minimal odor production.

DETAILED DESCRIPTION OF THE INVENTION

There is an increasing demand for an efficient, cost-effective method for composting organic material that will handle large volumes quickly, without producing noxious odors. A composting system 10 provided in accordance with a preferred embodiment of the present invention meets these demands.

Figure 1:
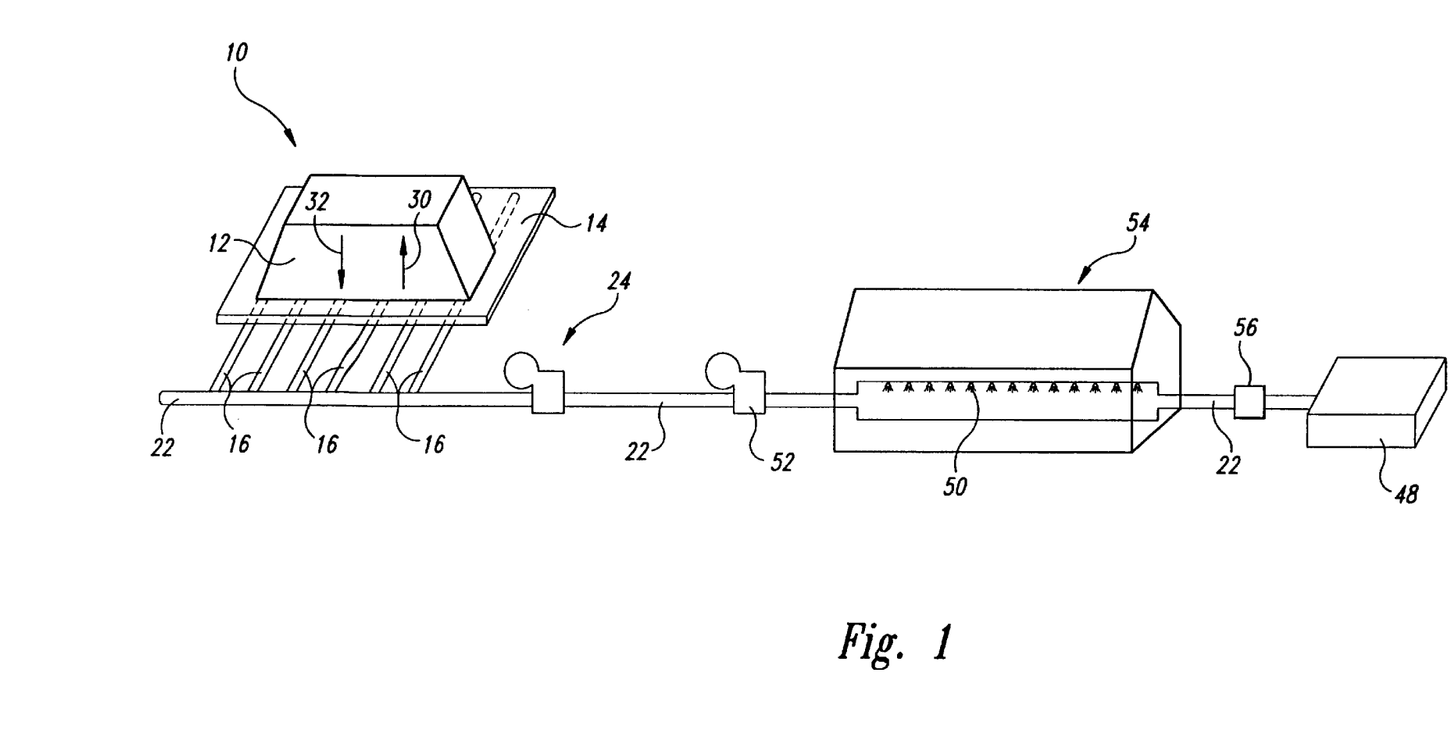
FIG. 1 is a schematic illustration of a front elevational view of a composting system provided in accordance with a preferred embodiment of the present invention.

More particularly, as illustrated in FIG. 1, a volume of organic material is stacked on a surface 14 to form a pile 12. A plurality of pipes 16 are positioned beneath the surface, the pipes being coupled to a conduit 22 which in turn is coupled to a fan assembly 24. The fan assembly, as described in greater detail below, selectively produces a positive air flow through the pipes 16 and pile 12, as illustrated by reference arrow 30, and a negative air flow through the pile as illustrated at reference arrow 32. By using a negative air flow, air is drawn down through the pile thereby aerating the pile and facilitating the decomposition process, while drawing odors and moisture from the pile. Positive airflow is used: (1) during loading of the pile to prevent compaction in a lower region of the pile; (2) to fluff and increase porosity of the pile during processing after a selected period of time has passed to allow the odors to diminish through aerobic mineralization; and (3) after the pile is removed from the surface, to blow out debris from openings 20 in surface 14, as described in greater detail below. The use of both positive and negative airflow is also beneficial in that it provides uniform drying and cooling of material, unlike prior art systems wherein only single direction airflow is used, which results in a top region of the pile drying out more quickly than a bottom region of the pile.

Moisture-laden air, water and odors are drawn out of the pile into manifold 22, and are passed through the system 10 to a biofilter 48. Prior to flowing through the biofilter 48, cool air and water vapor are injected into the conduit 22, for example, via fan 52 and spray heads 50, thereby saturating the air in the conduit and reducing the temperature and ammonia content of the air and water in the conduit 22. In a preferred embodiment, the conduit 22 transitions to larger inner diameter to reduce air velocity and passes through a greenhouse 54 while water is added to the system, the greenhouse capturing and using the heat radiated from conduit 22. Although a variety of configurations may be used, in a preferred embodiment, a coarse droplet cooling spray is injected into the conduit via 70 nozzles at a rate of 30 gallons per minute.

As further illustrated in FIG. 1, a sensor assembly 56 is positioned in the system upstream of the biofilter to monitor selected parameters, for example, temperature, saturation and the level of inhibitory constituents, such as ammonia. The amount of air and water vapor added to the conduit may therefore be adjusted accordingly, to maintain the selected parameters at a desired level. In a preferred embodiment, the air entering the biofilter is 100% saturated, it has a temperature of not more than 100° F., and it has an ammonia content of not more than 30 mg/m$^3$. It will be understood that the monitoring and adjustment of operating conditions may be done manually, or automatically through the use of a microprocessor based control system.

Figure 2:
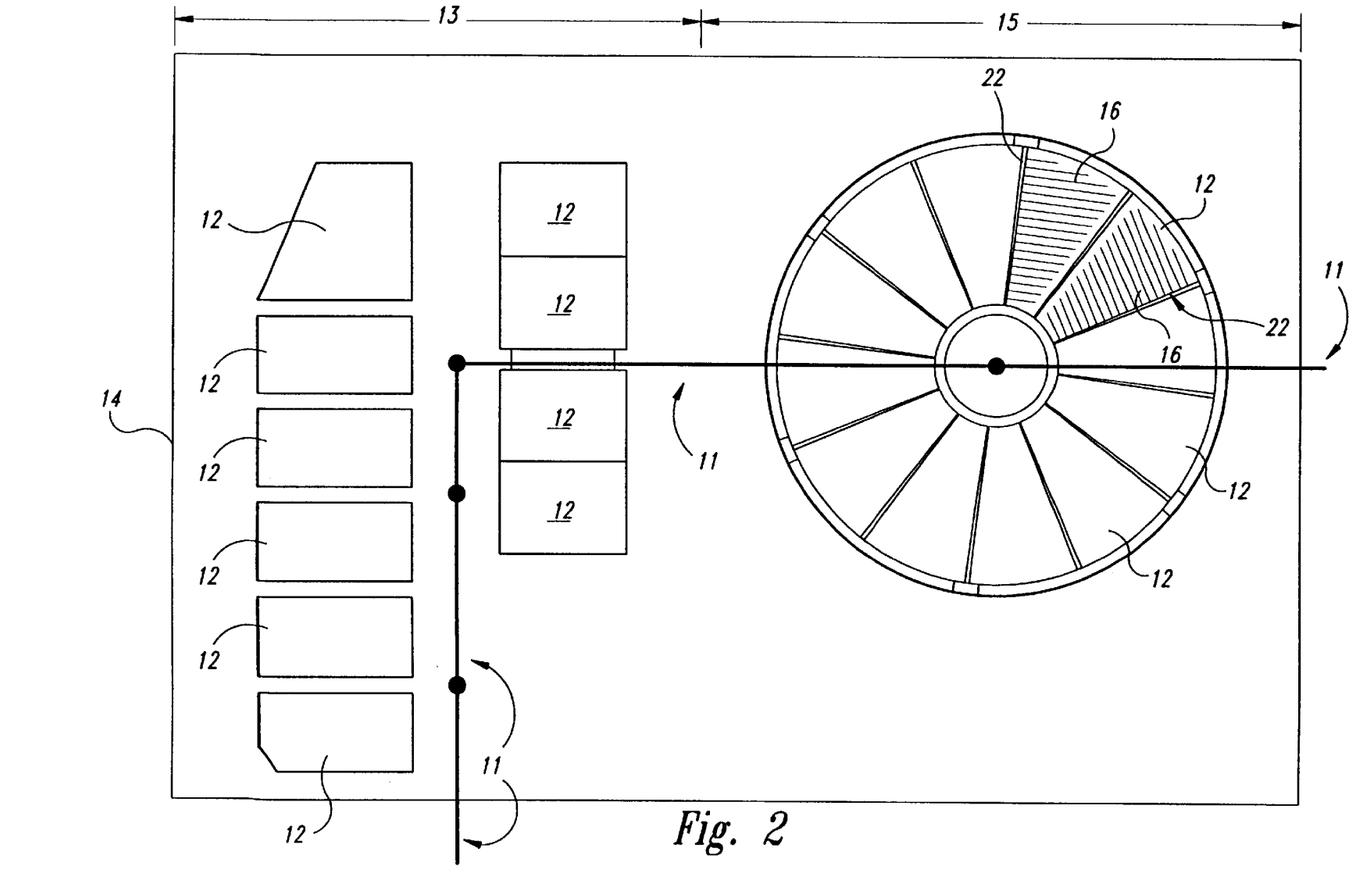
FIG. 2 is a schematic illustration of a top plan view of the layout of a system using the composting system illustrated in FIG. 1.

The process described above may be used on a large scale, as illustrated in FIG. 2. Depending on the space available, a number of piles 12 may be created and treated in accordance with a preferred embodiment of the present invention. For example, piles may be created in zones of 100 feet by 160 feet, and may be stacked to 20 feet high, in contrast to prior art systems wherein a typical pile height is 8–10 feet.

Once the piles have been treated for a selected period of time, for example, four weeks, the piles are moved from the first stage processing area 13 to a second stage processing area 15, as further illustrated in FIG. 2. Although in a preferred embodiment the piles are moved via conveyor 11, the piles may be moved to a new location via any available means. By moving the piles, they are agitated and broken up, thereby facilitating the decomposition process. For example, if the negative air stream is too cold, e.g., less than 110° F., this may indicate that fissures are present in the material and that air is therefore flowing through the fissures rather than through the body of material. By moving the pile, the fissures collapse and this problem is alleviated. Movement of the pile may also be beneficial if the pile is too dry, for example, if it has a moisture content of less than 40%, because movement facilitates surface irrigation, particularly if the material has a low porosity. In a preferred embodiment, the material is kept moist during the process, and is dried uniformly, resulting in a finished product having a final moisture content of less than 40%. Final drying can be manipulated by fan adjustments.

After the piles 12 are moved to the second stage processing area 15, the piles 12 are treated in accordance with a preferred embodiment of the present invention as described above for a selected period of time, for example, six weeks, until the product is stable and ready for distribution and use. In a preferred embodiment, piles of 10,000 cubic yards of material may be converted from raw material to a stable product within 10 weeks. The composting system of the present invention therefore allows large quantities of material to be processed quickly, in a cost-effective manner, while minimizing odor production. (It will be understood that the retention time in each stage may be increased or decreased as appropriate, depending on a variety of factors, including the volume and nature of material to be treated and the temperature, porosity, and moisture content of the material.)

Figure 3:
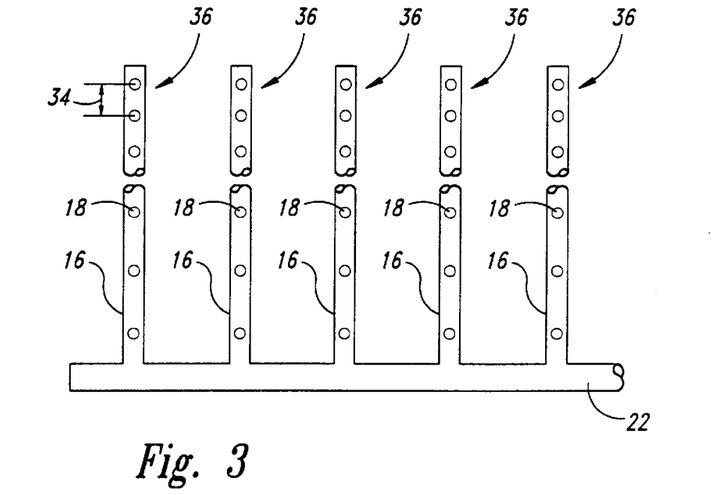
FIG. 3 is a top plan view of an aeration system comprising a portion of the composting system illustrated in FIG. 1.
Figure 4:
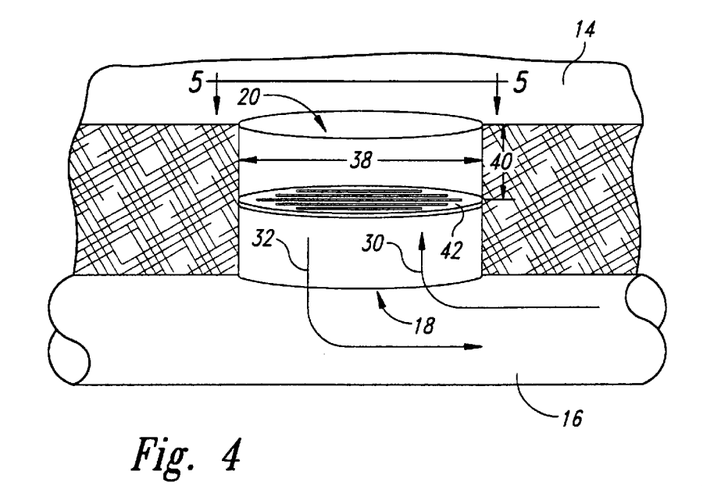
FIG. 4 is a front elevational view of a segment of the composting system illustrated in FIG. 1.

As illustrated in FIG. 3, the pipes are arranged substantially parallel to each other and perpendicular to the conduit. In a preferred embodiment, each of the pipes 16 has an inner diameter of 6 inches and extends substantially the fill length of the pile. Each of the pipes 16 is provided with a plurality of holes 18, each of which is aligned with an opening 20 in surface 14, as illustrated in FIG. 4. The distance 34 between adjacent holes 18 decreases in a distal region 36 of each pipe 16 relative to the conduit 22. This graduated hole spacing compensates for pressure losses in the pipes 16, and therefore facilitates uniform air distribution throughout the pile. It will be understood that the number of pipes per pile and number of holes per pipe will be dependent on the size of the pile. However, in a preferred embodiment, wherein a pile has a footprint of 100 feet by 160 feet, 29 pipes are provided beneath the pile, each pipe having 16 holes. The spacing of the holes on the pipe are graduated from 8 feet on center in a region proximate the conduit to 3 feet on center at distal region 36.

If a circular configuration is used, such as in the second stage processing area 15 illustrated in FIG. 2, the pipes 16 are still provided substantially parallel to each other and perpendicular to conduit 22, conduit 22 extending radially along a side of the pie-shaped zone 12. Again, the exact configuration will depend on the size of the zone 12. However, in a preferred embodiment, 12 zones are provided in a circular region having an outside diameter of 500 feet and an inside diameter of 125 feet, and 26 6-inch diameter distribution pipes 16, of varying lengths, are provided perpendicular to conduit 22.

As illustrated in FIG. 4, the pipes 16 are positioned beneath the surface 14. In this manner, the pipes remain fixed in a desired position, and are not moved by the stacking and removal of material on the surface, as is typical with prior art systems. Also, by positioning the pipes 16 beneath surface 14, the pipes are protected from damage, for example, that may occur by driving heavy machinery over the surface. Although the pipes may be positioned at a variety of depths, in a preferred embodiment, the pipes are positioned one foot below the surface 14.

Figure 5:
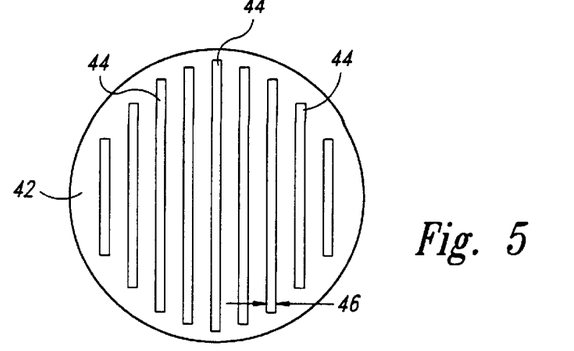
FIG. 5 is a top plan view of a portion of the composting system illustrated in FIG. 4, taken along line 5-5 of FIG. 4.

A grate 42 is positioned in each of the openings 20 below the surface 14, each grate 42 having openings 44, the width 46 of which is no greater than one quarter inch, as illustrated in FIG. 5. The grate allows air to flow through the system, while preventing rocks and other debris from entering the pipes 16. By positioning the grate beneath the surface 14, the grate is also protected from damage. Although it may be positioned at a variety of depths and may be sized according to the surface area being used, in a preferred embodiment, opening 20 has a diameter 38 of 2.5–6 inches and the grate 42 is positioned at a depth 40 of 2–5 inches beneath surface 14 to facilitate cleaning and the movement of air. Again, positive air flow is indicated by the directional arrow identified by reference numeral 30, and negative air flow is identified by the directional arrow noted by reference numeral 32.

Figure 6A:
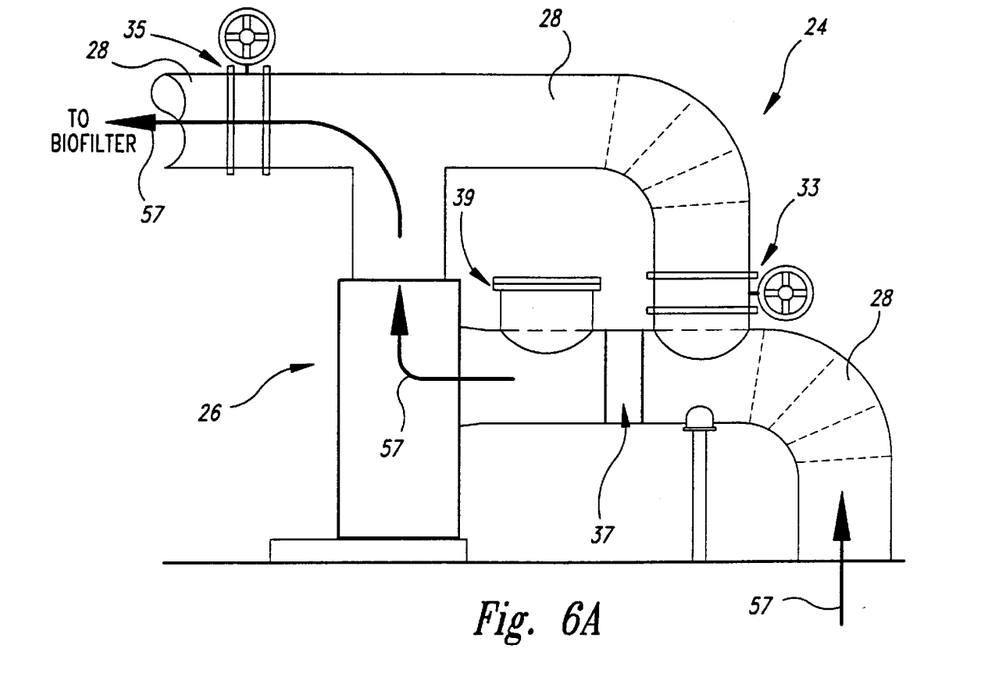
FIGS. 6a and 6b are front elevational views of a first fan assembly used in the composting system of FIG. 1.
Figure 6B:
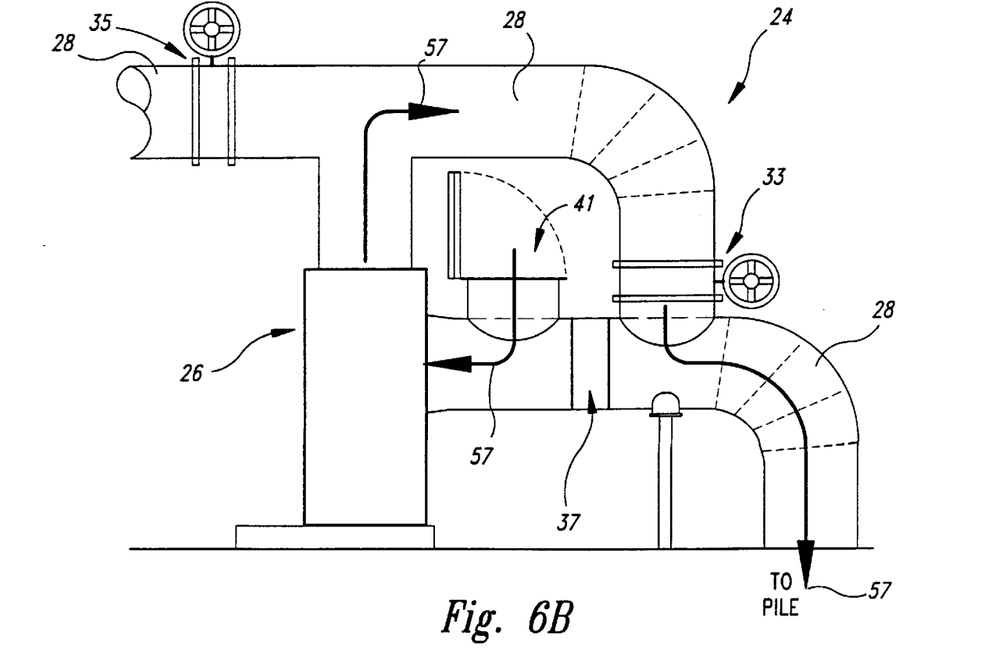

As illustrated in FIGS. 6a and 6b, the fan assembly 24 in the first stage processing area 13 is comprised of a unidirectional fan 26, a series of conduits 28, and a series of valves that are selectively opened and closed to create a positive or negative air flow through the system. More specifically, the assembly 24 is provided with a first valve 33, a second valve 35, a damper 37, and a gasketed door 39, all of which may be selectively opened or closed. In a negative air flow condition, as illustrated in FIG. 6a, the first valve 33 and the door 39 are closed, and the damper 37 and the second valve 35 are opened, such that the fan 26 draws air from the pile through the fan assembly in the direction indicated by reference arrows 57, where the air is discharged to the biofilter. To generate positive air flow through the pile, as illustrated in FIG. 6b, the second valve 35 and the damper 37 are closed, the door 39 is opened to allow air to be drawn in from atmosphere through intake 41 and the first valve 33 is opened. In this manner, air is drawn into the system and forced upward through the pile.

Figure 7A:
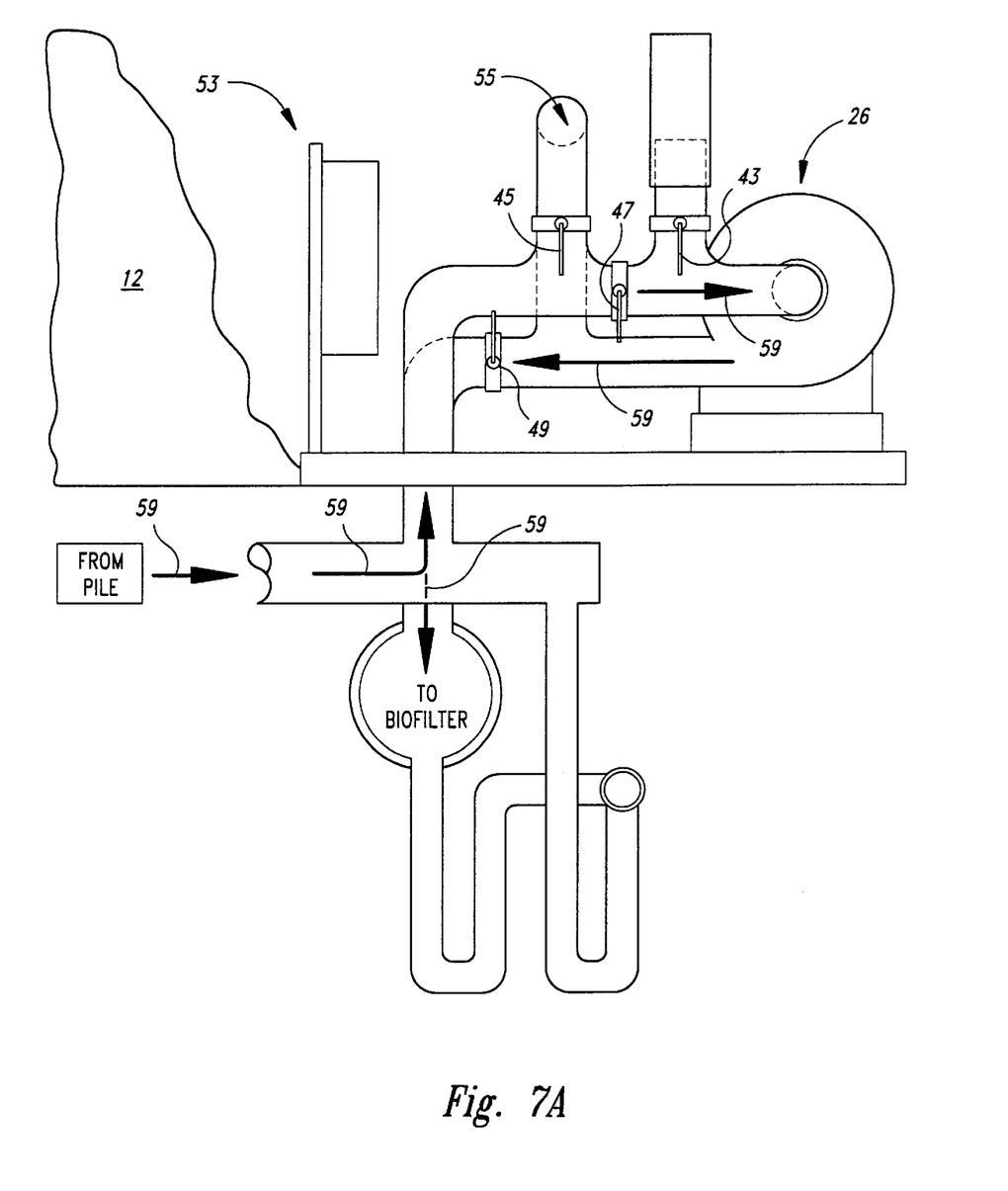
FIGS. 7a and 7b are front elevational views of a second fan assembly used in the composting system of FIG. 1.
Figure 7B:
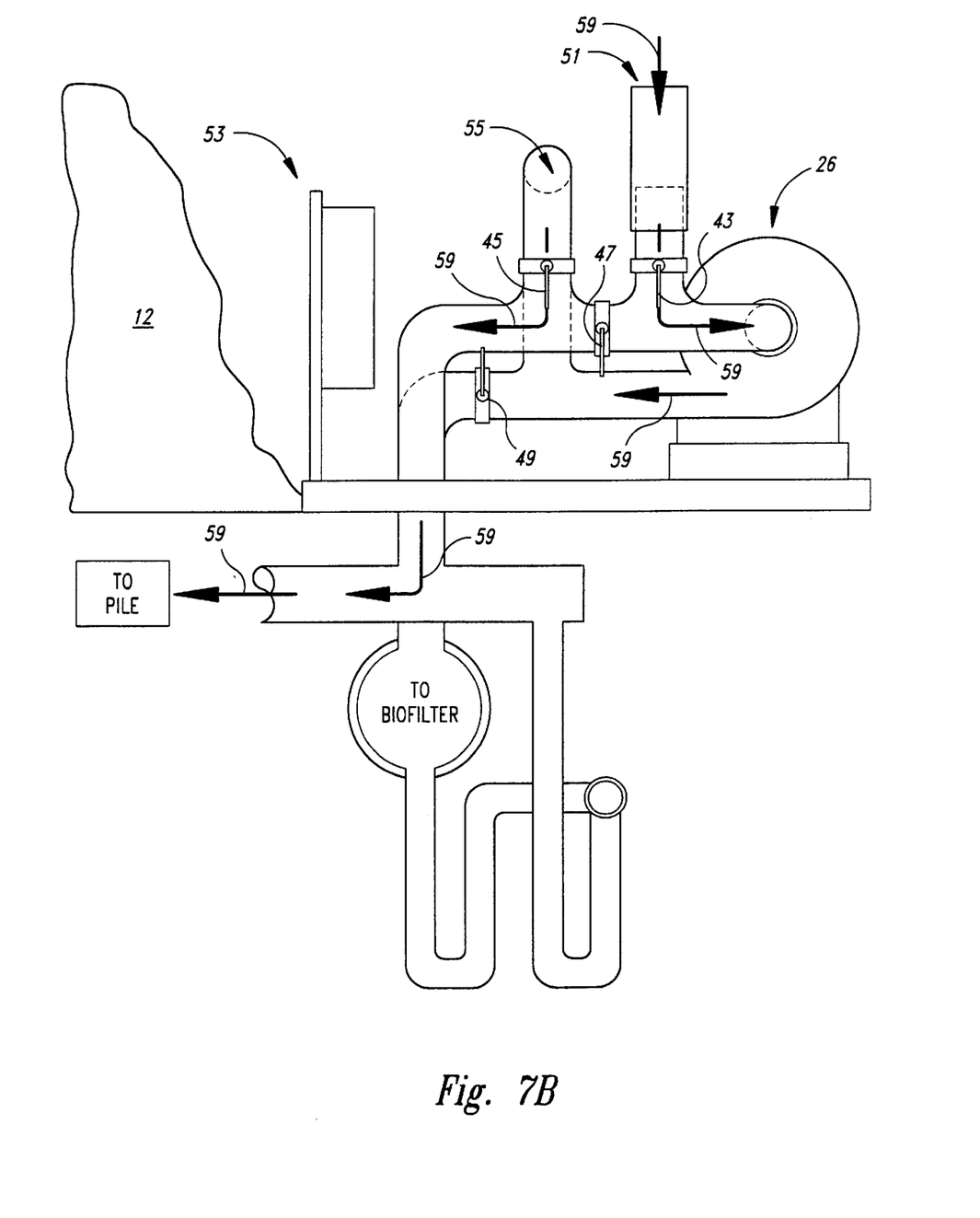

In a preferred embodiment, a second fan assembly 53 as illustrated in FIGS. 7a and 7b is used in the second stage processing area 15. The fan assembly 53 is comprised of a fan 26, a series of conduits, a first valve 43, a second valve 45, a third valve 47, and a fourth valve 49. To generate a negative air flow through the pile, as illustrated in FIG. 7a, the first and second valves 43 and 45 are closed, and the third and fourth valves 47 and 49 are opened, such that air is drawn from the pile 12 in the direction indicated at reference arrow 59. The air flows upward through the conduit, through the fan assembly and downward to the biofilter.

A positive air flow is illustrated in FIG. 7b, wherein the first valve 43 is open, such that the fan 26 draws air from atmosphere in through intake 51. The third and fourth valves 47 and 49 are closed, and the second valve 45 to cross over conduit 55 is open, such that air is drawn in from atmosphere and discharged into the pile 12. The fan assembly illustrated in FIGS. 7a and 7b is compact, having minimal bends, thereby reducing frictional losses. It will of course be understood that either of the fan assemblies illustrated in FIGS. 6a and 6b or 7a and 7b may be used in either of or both of the processing stages.

In a preferred embodiment, one fan is provided for each pile. In the first stage processing area 13, each fan is rated for 20,000 cfm at 12 inches water column and 3500 cfm at 26 inches water column. In the second stage processing area 15, each fan is rated for 4,000 cfm at 39 inches water column and 1800 cfm at 46 inches water column. Each of the fans is stainless steel to resist corrosion from water and condensate pulled from the pile. The fans are variable speed, and the flow rate through the piles may therefore be adjusted as needed to maintain the temperature and oxygen content at desired levels.

Therefore, in accordance with a preferred embodiment of the present invention, the temperature and oxygen content of the pile is monitored, and the rate of flow through the pile is adjusted accordingly to maintain these selected parameters at desired levels. It should be noted that the temperature of the pile rises and falls along a bell curve during the processing of the pile. The range of temperatures varies with the type of material being composted and the porosity and moisture content of the material. For example, the temperature may range from 125° F. to a maximum of 150° F. or from 110° F. to a maximum of 125° F. It is believed that preferred results are achieved if the initial temperature of the pile is 130° F. to 140° F., and if the temperature is not allowed to exceed 150° F. at any time during the process. Preferred results are also achieved if the temperature of the finished, stable product is not more than 110° F.

Figure 8:
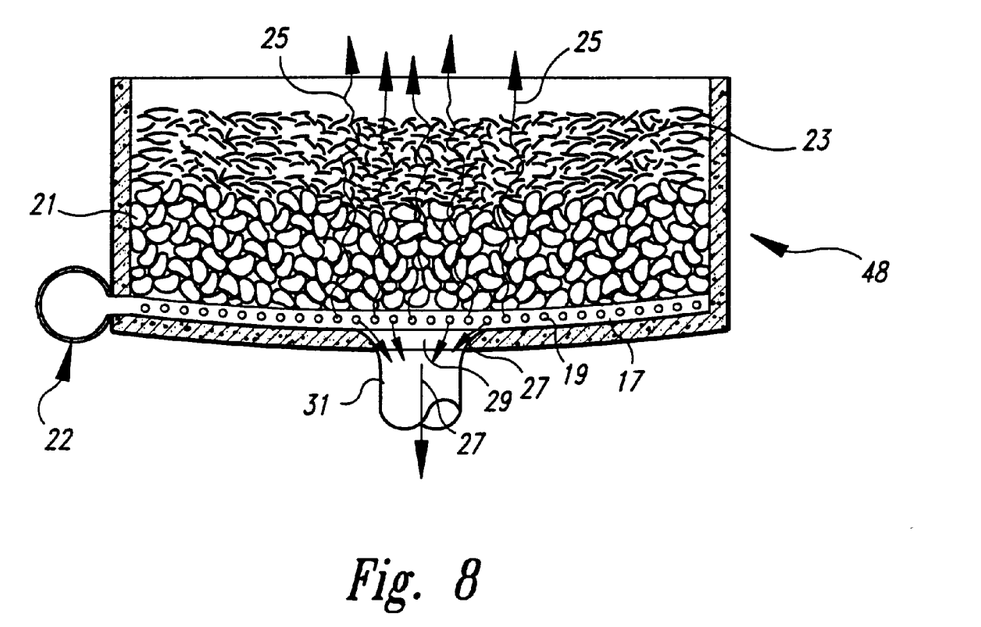
FIG. 8 is a partial cross-sectional elevational view of a biofilter provided in accordance with a preferred embodiment of the present invention.

A biofilter provided in accordance with a preferred embodiment of the present invention is illustrated in FIG. 8. Conduit 22, upon reaching a biofilter 48, branches into distribution pipes 17 that extend the length of the biofilter 48. The distribution pipes 17 are perforated, being provided with a plurality of holes 19 around the circumference of the pipe. The distribution pipes 17 are positioned on an impervious surface, having a catch basin 29 formed therein. A bedding media such as round river rock 21 is positioned between the distribution pipes and to a selected depth over the distribution pipes, thereby providing a working surface and protecting the pipes from damage. Biofilter media 23 is stacked on top of the bedding media 21, such that air flowing through distribution pipes 17 escape through holes 19 and rise up through the river rock and biofilter media, as illustrated by the arrows indicated by reference numeral 25. Bacteria in the biofilter media mineralize odorous compounds, thereby filtering the air. Simultaneously, condensed moisture in the distribution pipes 17 flows out of holes 19, as illustrated at reference arrows 27, where it is collected in catch basin 29 and discharged via sewer line 31 to a holding pond. Although a variety of configurations may be used, in a preferred embodiment, 20 12-inch diameter distribution pipes are provided. Each pipe has a length of 100 feet and is provided with 5/16th inch diameter holes spaced uniformly around the circumference and along the length of the pipe, such that each linear foot of pipe has 50 holes. Two-inch to six-inch river rock is used, and the biofilter media is comprised of 10% mature compost, 45% hardwood or conifer bark, and 45% shredded stumps or wood. One hundred percent of the biofilter media will pass a 3-inch sieve, 40% of the material will pass a 1-inch sieve, and 10% will pass a number 4 sieve. In an alternative embodiment, a wet scrubber may be used in place of the biofilter or as a backup to the biofilter.

Figure 9:
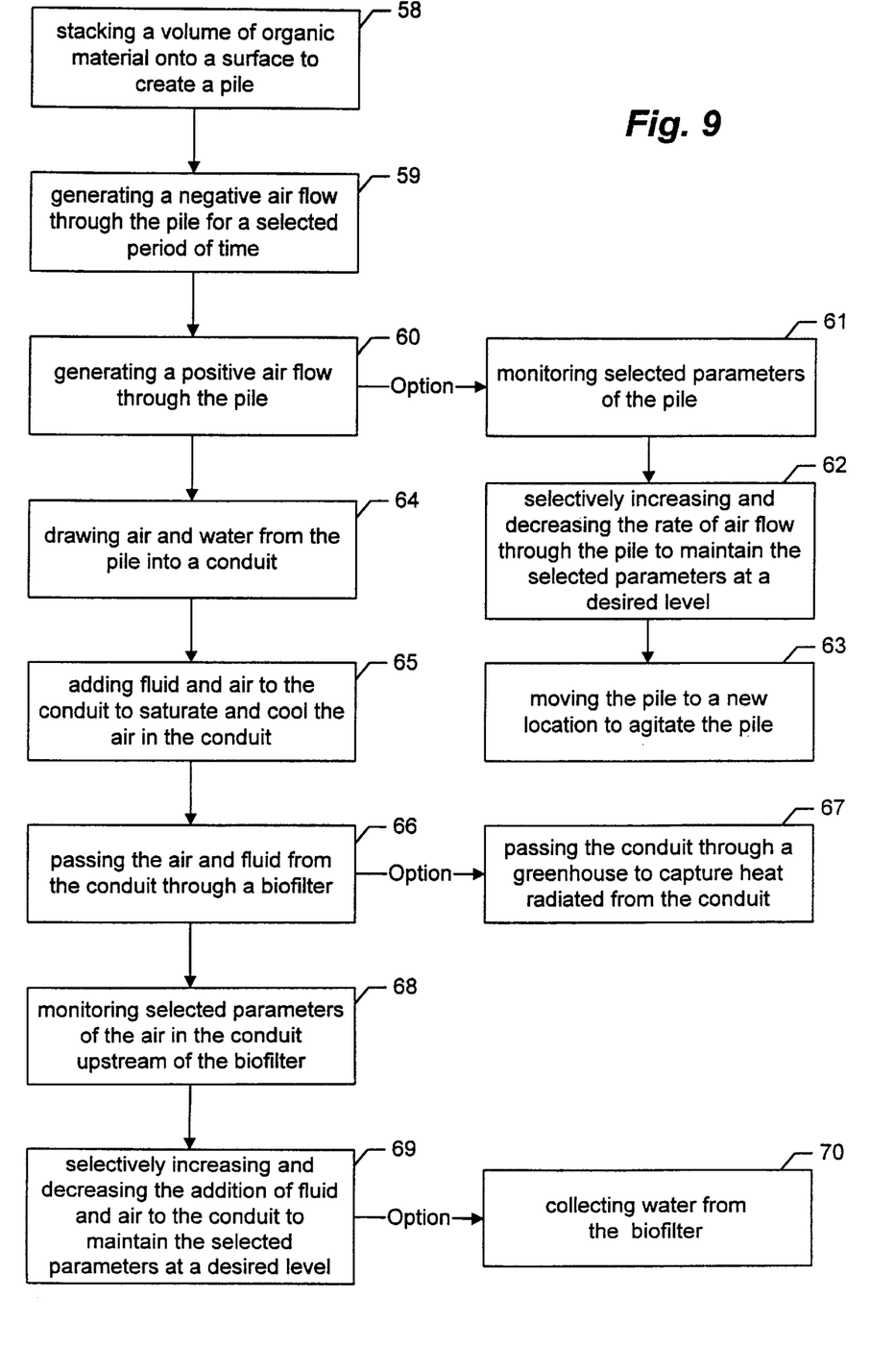
FIG. 9 is a diagram illustrating the steps of a preferred embodiment of the present invention.

A volume of organic material is therefore processed in accordance with a preferred embodiment of the present invention as illustrated in FIG. 9, by stacking a volume of organic material onto a surface to create a pile, step 58. A positive air flow is generated during the loading process to prevent compaction at the lower level of the pile. After the pile is formed, a negative air flow is generated through the pile for a selected period of time, step 59, thereby drawing air, moisture and odors downward from the pile. When the odor of the pile is minimal, a positive air flow is directed upward through the pile, step 60, thereby fluffing the pile and helping to ensure that the pile composts uniformly. In a preferred embodiment, a positive airflow is used three weeks after the pile is formed. Selected parameters of the pile are monitored, step 61, for example, the temperature and oxygen content. The rate of air flow through the pile is then selectively increased or decreased, as necessary, step 62, to maintain the selected parameters at a desired level.

After the pile has been processed in accordance with a preferred embodiment of the present invention for a first selected period of time, for example, four weeks, the pile is moved to a new location, step 63, thereby agitating the pile and promoting uniform processing. Both negative and positive air flows are forced through the pile as described above, for a selected period of time, for example, six weeks, until a stable composted product is achieved.

When a negative air flow is generated through a pile, air and moisture is drawn from the pile into a conduit, step 64, the moisture-laden air flowing through the conduit to a biofilter, step 66. Prior to reaching the biofilter, cool air and water vapor are added to the conduit to saturate and cool the air in the conduit, step 65, to thereby create proper conditions to cultivate selected bacteria that mineralize odorous compounds. The fluid is added to the conduits as it passes through a greenhouse such that heat radiated from the conduit is captured by the greenhouse, step 67. In a preferred embodiment, selected parameters of the air in the conduit are monitored, step 68, and the quantity of fluid and air added to the conduit upstream of the biofilter is selectively increased and decreased as necessary to maintain the selected parameters at a desired level, step 69. Water from the fan assembly and downstream of the biofilter is collected, step 70, and may be treated and reused as desired, for example, to irrigate the piles. In a preferred embodiment, sewer lines are connected to the cooling tunnel, the fan assembly and biofilter to transfer moisture to holding ponds, where the water is aerobically treated and reused for irrigation. In order to maintain moisture content at desired levels, the piles are irrigated as needed during loading and processing as is known to one of ordinary skill in the art.

A composting method and apparatus has been shown and described. From the foregoing, it will be appreciated that although embodiments of the invention have been described herein for purposes of illustration, various modifications may be made without deviating from the spirit of the invention. Thus, the present invention is not limited to the embodiments described herein, but rather is defined by the claims which follow.

What is claimed is:

1. A method for composting large volumes of organic material over a selected accelerated composting period while minimizing odor production, comprising:
   stacking a volume of organic material onto a surface to create a porous pile;
   generating a negative airflow through the porous pile for a first selected portion of the selected accelerated composting period;
   generating a positive airflow through the porous pile for a second selected portion of the selected accelerated composting period;
   drawing a first air and liquid from the porous pile into a conduit;
   adding a second air and liquid to the conduit to saturate and cool the first air and liquid in the conduit;
   passing the combined first and second air and liquid from the conduit through a biofilter; and
   mineralizing odorous compounds with a bacteria in the biofilter wherein the air is filtered.

2. The method according to claim 1, further comprising:
   providing a biofilter media comprising mature compost, hardwood, and shredded stumps wherein passing the combined first and second air and liquid further comprises running the air through the biofilter media of mature compost, hardwood and shredded stumps.

3. The method according to claim 1, further comprising:
   preventing compaction of the porous pile during stacking by generating a positive airflow through the pile during stacking.

4. The method according to claim 1, further comprising:
   reducing noxious odors through aerobic mineralization while drawing the negative air flow through the porous pile.

5. The method according to claim 1 wherein generating a positive airflow through the pile for a first selected portion of the composting period includes increasing the porosity of the pile during processing.

6. The method according to claim 1, further comprising:
   passing the conduit through a greenhouse to capture heat radiated from the conduit.

7. The method according to claim 1, further comprising:
   monitoring selected parameters of the first air and liquid in the conduit upstream of the biofilter; and
   selectively increasing and decreasing the addition of the second air and liquid to the conduit to maintain the selected parameters at a desired level.

8. The method according to claim 7, further comprising ensuring that the air entering the biofilter is 100% saturated, the temperature of the air entering the biofilter is no more than 100° F. and the ammonia content of the air entering the conduit is no more than 30 mg/m$^3$.

9. The method according to claim 1, further comprising:
   collecting liquid from the conduit upstream of and below the biofilter; and
   irrigating the pile with the collected liquid.

10. The method according to claim 1, further comprising:
    monitoring selected parameters of the pile; and
    selectively increasing and decreasing the rate of air flow through the pile to maintain the selected parameters at a desired level designed to maximize aerobic mineralization.

11. The method according to claim 10, further comprising:
    monitoring the temperature and oxygen content of the pile.

12. A method for composting large volumes of organic material over a selected accelerated composting period while minimizing odor production, comprising:
    stacking a volume of organic material onto a surface to create a pile;
    generating a negative airflow through the pile for a first selected portion of the selected accelerated composting period;
    generating a positive airflow through the pile for a second selected portion of the selected accelerated composting period;
    drawing a first air and liquid from the pile into a conduit;
    adding a second air and liquid to the conduit to cool the first air and liquid in the conduit;
    adjusting the volume of the second air and liquid to create proper conditions to cultivate selected bacteria;
    mineralizing odorous compounds with the selected bacteria; and passing the combined first and second air and liquid from the conduit through a wet scrubber.

13. The method according to claim 12, further comprising:

moving the pile to a new location to agitate the pile;

generating a negative air flow through the pile for a first selected portion of a composting period; and generating a positive air flow through the pile for a second selected portion of the composting period.

14. The method according to claim 13, further comprising:

drawing the first air and liquid from the pile into a conduit;

adding the second air and liquid to the conduit to cool the air in the conduit; and passing the combined first and second air and fluid from the conduit through the wet scrubber.

15. The method according to claim 14, further comprising passing the conduit through a greenhouse to capture heat radiated from the conduit.

16. The method according to claim 14, further comprising:

collecting liquid from the conduit upstream of and below the wet scrubber; and irrigating the pile with the collected liquid.

17. The method according to claim 13, further comprising:

monitoring selected parameters of the pile; and selectively increasing and decreasing the rate of air flow through the pile to maintain the selected parameters at a desired level.

18. The method according to claim 13, further comprising monitoring the temperature and oxygen content of the pile.

* * * * *